3,408,303
THORIA/EUROPIUM FLUORIDE LUMINOPHORS

Hans J. Borchardt, Wilmington, Del., assignor to E. I. du Pont de Nemours and Company, Wilmington, Del., a corporation of Delaware
No Drawing. Filed Sept. 13, 1965, Ser. No. 487,066
11 Claims. (Cl. 252—301.1)

ABSTRACT OF THE DISCLOSURE

Luminescent compositions suitable for fluorescent lights and X-ray or cathode ray screens can be made by heating the oxides, fluorides and oxyfluorides of thorium and europium to give a ratio of europium to total cations of 0.008 to 0.05 and a ratio of fluoride ions to europium of 1.5 to 4 to a temperature greater than 900° C. in an inert atmosphere.

Description of the invention

The present invention relates to novel luminescent compositions, and to a process for the preparation of these compositions. More particularly, the present invention relates to luminescent compositions having thorium oxide as a host material and containing trivalent europium cations and fluoride anions.

Luminescent compositions are generally composed of a host material, and such as a metal oxide, and an activator, which may be an impurity atom. In one type of luminescence mechanism, energy, provided by, e.g., X-rays, is absorbed by the host material and transferred to the activator from which the luminescent emission occurs. In certain applications, particularly those involving emission in response to X-ray excitation, it is desirable that the host material include a substantial proportion of heavy atoms since such atoms absorb X-ray energy more effectively than lighter atoms. Among heavy elements which may be employed are lead, bismuth, thorium, and uranium. It is also desirable that the luminescent composition be substantially free of color, for color in the material not only detracts from its own luminescence but may affect the luminescence of other phosphors with which it is mixed in particular applications.

The present invention provides crystalline, substantially colorless compositions which exhibit highly efficient luminescence on exposure to X-rays, and also on ultraviolet and cathode-ray excitation. These luminescent compositions have the fluorite crystal structure and consist essentially of thorium cations, europium cations, oxygen anions, and fluoride anions, the atomic ratio of europium ions to total cations [(Eu/Eu+Th)] being in the range of 0.008–0.05, and the ratio of fluoride ions to europium ions (F/Eu) being in the range of about 1.5–4, and oxygen anions being present in an amount sufficient to provide over-all electrical neutrality, i.e., to insure that the total negative charges of the anions are sufficient to counterbalance the total positive charges of the cations.

The compositions of this invention are readily obtained by heating mixtures of thorium dioxide and europium trifluoride. When only these two reactants are employed, the F/Eu ratio will be about 3, i.e., the compositions will have the formula $(ThO_2)_{1-x}(EuF_3)_x$ where $x$ is between 0.008 and 0.05. The ratio can be varied between 1.5 and 4 by adding additional ingredients such as thorium tetrafluoride ($ThF_4$) or europium oxide ($Eu_2O_3$), so long as the required Eu/(Eu+Th) ratio is maintained.

The reactants should be thoroughly mixed, and preferably, should be free of moisture. The presence of moisture is especially undesirable in products containing a low proportion of fluoride. Freedom from moisture can be assured by thoroughly driving the reactants and thereafter handling them in an inert, moisture-free atmosphere.

For conversion to the luminescent composition, the reactants are intimately mixed in the proportions selected and heated to a temperature above 900° C. and usually in the range of 900–1600° C. The heating may be carried out in a sealed vessel to prevent loss of fluoride and may be conducted in stages if desired. An inert atmosphere, such as an atmosphere of nitrogen or argon can be employed during the heating period, but is not necessary. The temperatures near the upper limit are preferred, e.g., 1300°–1600° C.

No external pressure is required at 900° C., however, as the temperature is increased, it is preferred to employ pressure, e.g., 200–300 p.s.i.

Reaction time is not critical and times of 30 minutes, 1 hour or up to 24 or more hours can be employed.

At Eu/(Eu+Th) ratios of up to about 0.05, only the single fluorite crystal phase is obtained. At ratios above 0.05, efficient phosphors are also produced; however, such compositions contain other crystal structures or phases beside the fluorite structure because the solubility limit (consequently the phase boundary of the fluorite phase) of $EuF_3$ in $ThO_2$ is about 5 atom percent, i.e., $$Eu/(Th+Eu)=0.05$$

The exact proportion of $EuF_3$ at which this boundary occurs depends upon the temperature and F/Eu ratio and, of course, is subject to the usual uncertainties in experimentally determined valus. The preferred compositions of this invention are the single phase compositions up to and including the phase boundary composition, the compositions beyond the phase boundary being mixtures of these compositions with other material.

When the fluoride ion content is increased to obtain F/Eu ratios up to 4, for example, by adding $ThF_4$ as a third ingredient in the reaction mixture, the preferred single fluorite crystal phase will be limited by the solubility of $ThF_4$ in ThO, whirh is also approximately 5 atom percent. Compositions containing higher proportions of fluoride are mixtures of the preferred compositions with another phase. The exact $ThF_4$ content at which this phase boundary occurs is determined by factors of the type enumerated above in the discussion of the $EuF_3$ phase boundary.

The invention is illustrated in greater detail in the following examples in which quanties of reactants are given in parts by weight.

EXAMPLE I

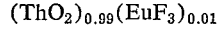

$(ThO_2)_{0.99}(EuF_3)_{0.01}$ was prepared by thoroughly mixing solid $ThO_2$(1.307 g.) and solid $EuF_3$ (0.010 g.) in powder form and heating the mixture in a closed system. The mixture was sealed into a platinum tube ⅜″ diameter by 3″ long in air. The platinum tube was placed in a pressure reactor. A pressure of 225 p.s.i. was applied and maintained throughout the synthesis. The temperature was raised in about two hours to 1000° C. and held there for 24 hours. The reactor was then cooled in about three hours, the platinum tube cut open, and the product removed. The product was characterized by its X-ray powder diffraction pattern, as well as by chemical analysis. The X-ray powder diffraction pattern shows the presence only of a fluorite ($ThO_2$) phase.

$(ThO_2)_{0.99}(EuF_3)_{0.01}$, as well as a standard commercial intensifying screen phosphor $CaWO_4$, was pressed into ¼″ diameter holes in a ⅛″ thick piece of fiberboard and retained on both sides with transparent adhesive tape. A piece of panchromatic film was placed upon the board and both board and film were placed into a medical X-ray film cassette containing no intensifying screen. The cassette was exposed to X-rays from a tungsten target tube operated at 70 kvp. (peak kilovoltage) 100 ma. 1/20th second exposure. When the film was developed, there were dark spots on the film where light from the phosphors was emitted. The film density was read and a value of 0.54 was obtained corresponding to the cited sample of $CaWO_4$, while the film density corresponding to $(ThO_2)_{0.99}(EuF_3)_{0.01}$ was 0.55.

From an experimentally determined calibration curve for the film, it was determined that the above film densities corresponded to an exposure ratio of 1.04; i.e., the apparent emission from $(ThO_2)_{0.99}(EuF_3)_{0.01}$ was 1.04 times that from $CaWO_4$. However, this did not take into account that the film employed was more sensitive to the blue-UV emission of $CaWO_4$ than to the red emission of $(ThO_2)_{0.99}(EuF_3)_{0.01}$. Correcting for this difference in spectral sensitivity of the film led to an actual exposure ratio of 1.52. Thus, the efficiency of $(ThO_2)_{0.99}(EuF_3)_{0.01}$ in converting X-rays to light is greater than that of $CaWO_4$ by a factor of 1.52.

The intensity of ultraviolet excited fluorescence was measured relative to that of a commercial red phosphor, magnesium arsenate, manganese activated (National Bureau of Standards Standard Sample 1030. The ultraviolet quantum efficiency of this particular material is reported to be 0.71). The sample of $(ThO_2)_{0.99}(EuF_3)_{0.01}$ and the standard were placed in the sample holder compartment of a spectrophotometer reflectance attachment. Luminescence was excited by 263 millimicron ultraviolet originating from a mercury lamp whose output was passed through a monochrometer set at 263 millimicrons with a slit width of 1.5 mm. The emission from the sample and standard was filtered to remove reflected exciting radiation and was detected by a photomultiplier operated at 750 volts. The output from the photomultiplier was read on a microammeter and indicated the relative luminescent efficiency of the sample compared to the standard. The relative UV excited emission intensity was found to be 54% of the standard.

EXAMPLES II–VII

These examples are summarized in Table I. Example II was carried out by the same method described for Example I. The preparation of Examples III–VII differs only in that the reactants were handled and sealed into the platinum tubes in a protective atmosphere of dry argon.

The starting material, $ThO_2$, was prepared as follows: 250 ml. 70% $HNO_3$ were diluted to 3 liters with deionized water. $Th(NO_3)_4 \cdot 4H_2O$ (17.2 g.) was added and allowed to dissolve. Solid oxalic acid ($H_2C_2O_4 \cdot 2H_2O$, 30 g.) was added, whereupon thorium oxalate precipitated. The slurry was heated to 60° C., stirred for 1½ hours, and filtered. The solid was washed two times with water and dried in a vacuum oven at 60° C. It was then ignited at 650–700° C. for five hours in air thereby converting the oxalate to $ThO_2$.

$EuF_3$ was prepared as follows: 5.29 g. of $Eu_2O_3$ was dissolved in 200 ml. 70% $HNO_3$. The solution was diluted with water to 3 liters, 20 ml. of aqueous (48%) HF were added and the liquid heated for about two hours at 50° C. The resulting suspension was centrifuged, the liquid decanted, and the residue, consisting of moist $EuF_3$, was dried overnight at 75° C. in a vacuum oven.

The products of this invention are distinguished from mixtures of the reactants in a number of characteristics as indicated by measurements of emission intensity and ultraviolet absorption. Firstly, the relative emission intensity of europium trifluoride on exposure to ultraviolet light measured according to the procedure described above in Example I, is approximately 2% of that of the magnesium arsonate standard. Thorium dioxide does not fluoresce at all under these conditions (intensity, zero), and a physical mixture of europium trifluoride and thorium dioxide therefore does not exhibit an emission intensity of more than 2%. In comparison, the products prepared by the process of the present invention in which europium fluoride and thorium dioxide are reacted at high temperature exhibit emission intensities of about 50% as indicated hereinbefore.

Secondly, neither thorium dioxide nor europium trifluoride exhibits appreciable absorption in the ultra-violet region 2500–2650 A. The luminescent compositions of this invention derived from these compounds, however, exhibit a very strong absorption band in this region.

The products of this invention are useful as phosphors for X-ray intensifying screens as illustrated in the examples. The products also luminesce efficiently on excitation by ultraviolet light, such as that originating from a low-pressure mercury discharge (2537 A.), and are useful as the phosphors in fluorescent lights. The materials are also efficiently excited by exposure to cathode rays and can be employed as color components in color television tubes.

TABLE I.—EXAMPLES II–VII

| Example No. | Composition | Gms. $ThO_2$ | Gms. $EuF_3$ | Phase Formed | Wt. Percent Eu Theo. | Wt. Percent Eu Found | Wt. Percent F Theo. | Wt. Percent F Found | Body Color | X-ray [1] | UV [2] |
|---|---|---|---|---|---|---|---|---|---|---|---|
| II | $(ThO_2)_{0.98}(EuF_3)_{0.02}$ | 1.294 | 0.021 | Fluorite only | 1.16 | | 0.43 | | White | 1.36 | 0.57 |
| III | $(ThO_2)_{0.97}(EuF_3)_{0.03}$ | 3.331 | 0.082 | ___do___ | 1.74 | 1.78 | 0.65 | 0.43 | ___do___ | 1.06 | 0.48 |
| IV | $(ThO_2)_{0.96}(EuF_3)_{0.04}$ | 3.296 | 0.109 | ___do___ | 2.32 | 2.25 | 0.87 | 0.71 | ___do___ | 1.14 | 0.49 |
| V | $(ThO_2)_{0.95}(EuF_3)_{0.05}$ | 3.262 | 0.136 | ___do___ | 2.91 | 2.96 | 1.09 | 0.89 | ___do___ | 1.04 | 0.51 |
| VI | $(ThO_2)_{0.90}(EuF_3)_{0.10}$ | 3.090 | 0.272 | Fluorite plus ortho $EuF_3$ | 5.88 | 5.74 | 2.20 | 1.25 | ___do___ | 0.86 | 0.53 |
| VII | $(ThO_2)_{0.70}(EuF_3)_{0.30}$ | 2.4035 | 0.815 | ___do___ | 18.4 | 18.9 | 6.91 | 4.85 | ___do___ | 0.64 | 0.52 |

[1] Relative to $CaWO_4$.  [2] Relative to "NBS Standard Sample 1030."

The luminescent compositions of this invention give surprisingly more intense fluorescent emissions than do known thorium dioxide-europium oxide compositions. For example, Table II compares the emission intensities at various europium levels of compositions of this invention and thorium dioxide-europium oxide compositions, when using thorium dioxide-10% europium oxide as a standard of 1.00.

TABLE II

| x | $(ThO_2)_{1-x}(EuO_{1.5})_x$ | $(ThO_2)_{1-x}(EuF_3)_x$ |
|---|---|---|
| 0.010 | | 2.07 |
| 0.015 | 0.93 | |
| 0.020 | | 2.30 |
| 0.030 | 1.14 | 1.78 |
| 0.035 | | |
| 0.040 | 1.54 | 1.84 |
| 0.050 | | 1.90 |
| 0.100 | 1.38 | 2.26 |
| | [1] (1.00) | |

[1] Standard.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A luminescent composition of the fluorite crystal structure consisting essentially of thorium cations, europium cations, oxygen anions and fluoride anions, wherein
  (a) the ratio Eu/(Eu+Th) is between about 0.008 and 0.05,
  (b) the ratio F/Eu is between about 1.5 and 4, and
  (c) the oxygen anions are present in an amount sufficient to provide over-all electrical neutrality in the composition.

2. A luminescent composition of the fluorite crystal structure consisting essentially of thorium cations, europium cations, oxygen anions and fluoride anions, wherein
    (a) the ratio Eu/(Eu+Th) is between about 0.008 and 0.05,
    (b) the ratio F/Eu is about 3, and
    (c) the oxygen anions are present in an amount sufficient to provide over-all electrical neutrality in the composition.

3. A luminescent composition of the fluorite crystal structure represented by the formula $(ThO_2)_{1-x}(EuF_3)_x$ wherein $x$ is between 0.01 and 0.05.

4. $(ThO_2)_{0.99}(EuF_3)_{0.01}$.
5. $(ThO_2)_{0.98}(EuF_3)_{0.02}$.
6. $(ThO_2)_{0.97}(EuF_3)_{0.03}$.
7. $(ThO_2)_{0.96}(EuF_3)_{0.04}$.
8. $(ThO_2)_{0.95}(EuF_3)_{0.05}$.

9. Process for preparing a luminescent composition of the fluorite crystal structure consisting essentially of thorium cations, europium cations, oxygen anions and fluoride anions wherein
    (a) the ratio Eu/(Eu+Th) is between about 0.008 and 0.05,
    (b) the ratio F/Eu is between 1.5 and 4, and
    (c) the oxygen anions are present in an amount sufficient to provide over-all electrical neutrality in the composition,
which comprises heating above 900° C. in an inert, moisture-free atmospheric in a sealed vessel, a dry mixture of $ThO_2$ and $EuF_3$ where the ratios of the ions in said mixture are within the ranges set forth above.

10. The process of claim 9 wherein the temperature is between about 1300° and 1600° C. and the pressure is between about 200–300 p.s.i.

11. The process of claim 9 wherein the dry mixture also contains $ThF_4$, $Eu_2O_3$, or both.

References Cited

UNITED STATES PATENTS

| | | | |
|---|---|---|---|
| 2,323,284 | 6/1943 | Toorks | 252—301.1 |
| 3,163,610 | 12/1964 | Yocom | 252—301.1 X |
| 3,250,722 | 5/1966 | Borchardt | 252—301.4 X |
| 3,301,791 | 1/1967 | Brixner | 252—301.1 X |

OTHER REFERENCES

Nichols et al.: Journal Optical Society, vol. 20, 1930, pages 110, 120, 122 and 123.

CARL D. QUARFORTH, *Primary Examiner.*

M. J. SCOLNICK, *Assistant Examiner.*